UNITED STATES PATENT OFFICE 2,620,516

SYNTHETIC POLYMERIC PRODUCT AND PROCESS FOR PRODUCING THE SAME

Karl Erwin Müller, Leverkusen-Bayerwerk, Germany, assignor to Farbenfabriken Bayer, Leverkusen, Germany No Drawing. Application July 2, 1949, Serial No. 102,941. In Germany February 23, 1949

14 Claims. (Cl. 18—58)

This invention relates to synthetic polymeric products and a process for their production and in particular to isocyanate-modified-polyesters. The purpose of the invention is to provide an improved process for the production of diisocyanate-modified-polyesters which can be handled in the liquid phase. As described, for example, in the BIOS Final Report No. 1166, "Synthetic Rubber, Interrogation of Dr. Bayer and Dr. Roelig," the polyesters particularly suited for modification with diisocyanates are the substantially linear, dicarboxylic acid-dihydric alcohol-poly condensation products having as terminal groups predominantly alcoholic hydroxyl groups.

According to a process which is not claimed herein, products of valuable properties are obtained by the action of diisocyanates on linear polyesters and subsequent introduction of urea-groups. In this prior process it is a condition that the esters are linear and are predominantly built up from aliphatic components and that, apart from the endgroups of the chain, they have no radicals capable of reaction with isocyanates. Furthermore, the amount of isocyanates must be so adapted that it exceeds the reactive endgroups of the polyesters. For the introduction of the urea-groups, those diisocyanate groups are employed which are attached to each end of the polyester chain. There are two possibilities of effecting this purpose. As is known to those skilled in the art diisocyanates react with amines and diamines respectively as well as with water, forming ureas. While the first mentioned reaction is an addition, the latter is accompanied by the development of carbon dioxide. The urea-groups formed which cause a linear prolongation of the chain react with further diisocyanate and ester-diisocyanate respectively by shifting a hydrogen link and cross linking between the chains. There are fundamental differences in the working up of the products obtained by linear prolongation on the one hand and cross linking on the other hand. While the prolongation of the polyester chains by means of the urea-groups leads to liquid and soluble melts which differ from the polyester employed as primary products by a somewhat enhanced viscosity, the cross linking reaction produces crumbly, more or less insoluble products which can be further worked up only by means of calenders and presses. In practice the two reactions do not proceed distinctly but combinedly.

In consequence thereof as a rule there is no room for any special variations in the working up. In particular working in the liquid phase is impossible.

It is an object of the present invention to provide improved diisocyanate-modified-polyesters. Another object of the present invention resides in the provision of diisocyanate-modified-polyesters capable of being handled in the liquid phase.

A further object is to provide an improved process for the production of highly elastic polymeric products.

A still further object is the provision of an improved process of the type hereinbefore referred to, wherein the reactivity of the reactants is so graduated that premature hardening is prevented.

Still further objects will become apparent as the following specification proceeds.

The invention is based on the discovery that by a suitable adjustment of the reactivity of the diisocyanate and ester-diisocyanate respectively on the one hand and the diamine on the other working up of the mix in the liquid phase is made possible, provided that the components of the reaction, viz. the diisocyanate and the diamine are so selected that the cross linking by means of the urea-groups is kept separate from the reaction prolonging the polyester chains. Since the diisocyanates differ greatly as regards their reactivity and since, furthermore, each diamine possesses a different constant of dissociation, the above conditions may be fulfilled by suitable combination or selection of the reactants. As regards the reactivity of the diisocyanates, it is known that the aliphatic diisocyanates react more slowly than those of the aromatic series.

Among these of the aromatic series large differences and variations may also be found. Thus, for instance, 1.5-naphthylene-diisocyanate possesses a high reactivity which declines in the sequence: nitrobenzidine-diisocyanate, toluylene-diisocyanate, hexamethylene-diisocyanate. In the amine group the behavior is the other way round. The aliphatic diamines are by far more reactive than the aromatic diamines. In the aromatic series considerable variations can be effected by the influence of substituents. Thus, for instance, the reactivity is considerably retarded by negative substitution such as by chloro- and nitro-groups.

In order to comply with the above mentioned conditions which permit working up in the liquid phase it is necessary to combine slow-reacting diisocyanates with reactive diamines and vice versa. A critical limitation of the possibility of combining diisocyanates and diamines which permit working up in the liquid phase, consists in the speed of reaction of both components in boiling methylene-chloride. If turbidity results immediately in a semimolar concentration after the components have been mixed together owing to the formation of a polyurea, it will be impossible to transfer this combination on the polyester and still work the reaction mixture up in the liquid phase.

Only in those cases where the time elapsing before turbidity of the methylene-chloride solution sets in it is at least 25–30 sec. is the working up in liquid phase assured. Thus by employing, for instance 1.5-naphthylene-diisocyanate and dichlorobenzidine a material capable of being cast is obtained which excels by its flowing capacity and which may be shaped by centrifuging, while substitution of dichlorobenzidine by benzidine or 1.5-naphthylene-diamine renders this manner of working up impossible.

If hexamethylene-diisocyanate and toluylene-diamine are employed the material is also primarily liquid and can be used for the production of steeped articles if desired with the addition of solvents and for spraying, squirting and varnish filling. Toluylene-diisocyanate offers the same range of employment if combined with o-dichlorobenzidine or dianisidine. Changing over to m-dichlorobenzidine results in a faster reaction. The final state of the reaction is attained by heating the cast or die-cast samples to 100° C. for 4–5 hours. Temperatures between 50 and 200° C. are suitable for this step.

Apart from the conditions of working up the mechanical properties of the products obtained are also partly dependent upon the combination of the diisocyanate with the diamine. Thus products with a low load are obtained by the use of hexamethylene-diisocyanate, while naphthylene-diisocyanate in combination with dichlorobenzidine yield rubber-elastic products with a high load. It is easy to change the properties of the materials in any desired direction owing to the innumerable possibilities of variation.

Apart from the diamines amino-alcohols may be employed for the cross-linking since the reactivity of the hydroxy-group with respect to diisocyanates is smaller than that of the amino-group. The use of amino-alcohols also assures a liquid intermediate state, provided that the combination of diisocyanate with amino-alcohol satisfies the test described above. p-amino-phenyl-ethyl-alcohol, p-amino-phenyl-methyl-carbinol and others are among the amino-alcohols, which may be employed. Instead of amino-alcohols mixtures of diamines with glycols may be used as cross-linking agents. The properties of the end-products vary with the amounts selected in the direction specific for each cross-linking agent.

The new elastic diisocyanate-modified-polyesters may be employed for all kinds of use where elasticity, resistance to chemicals and to swelling is desirable. They may be made into bicycle tires, soles for shoes and boots, balls for golf, tennis and other purposes, packing materials and the like. This enumeration is by no means limitative to the uses to which the new polymeric products can be put since other modes of employment will be obvious to those skilled in the art especially in connection with the mechanical data given in the following examples.

The following examples illustrate the invention:

Example 1

1000 parts of a glycol-adipic acid ester of the OH-value 50 and the acid value 1 are carefully dried in a closed vessel provided with a stirrer in a vacuum of 12 mm. pressure at a temperature of 130° C. At the same temperature 160 parts of 1.5-naphthylene-diisocyanate are added. After a few minutes the temperature rises to about 140° C. After the temperature has dropped to 135° C., 54 parts of ortho-dichlorobenzidine are stirred into the mixture and the weakly reddish colored liquid is poured into the desired molds. By heating again for 10 hours at 100° C. a rubber-like material possessing the following mechanical properties is obtained:

| | |
|---|---|
| Tensile strength _____pounds/inch$^2$__ | 1470 |
| Elongation at break_____per cent__ | 271 |
| Permanent set _____do____ | 13 |
| Load _____ | 106 |
| Hardness_____ | 80 |
| Tear resistance_____ | 47 |
| Resiliency_____ | 53 |

Example 2

A mixture of 700 parts of glycol adipic acid ester of the OH-value 50 and acid value 1, and 200 parts of 1.2-propylene glycol adipic acid ester (OH-value 47, acid value 1) both blown into a vessel with air, is dried in vacuo at 130° C. with stirring. After the addition of 160 parts of naphthylene-diisocyanate (1.5), 54 parts of ortho-dichlorobenzidine are added with stirring after the reaction has ceased. The o-dichlorobenzidine is made into a paste with 100 parts of 1.2-propylene glycol at 100° C. After the paste which should be well distributed in the melt has been introduced the liquid contents of the vessel are poured into a rotating drum which is heated to 100° C., the inside of the drum being provided with the profile of a bicycle tire. After about 10 minutes the contents of the drum are solid and after further 20 minutes the ready made tire can be taken out. After-heating for 5–6 hours is effected in a drying closet at 100° C. The tire possesses the following properties:

| | |
|---|---|
| Tensile strength _____pounds/inch$^2$__ | 1470 |
| Elongation at break_____per cent__ | 600 |
| Permanent set _____do____ | 16 |
| Load _____ | 72 |
| Hardness_____ | 80 |
| Tear resistance_____ | 25 |
| Resiliency_____ | 50 |

Example 3

On replacing the 1.5-naphthylene-diisocyanate of Example 2 by 130 parts of toluylene-diisocyanate, working with the same quantities and under the same reaction conditions, a tire is obtained which possesses the following properties:

| | |
|---|---|
| Tensile strength_____pounds/inch$^2$__ | 1770 |
| Elongation at break_____per cent__ | 280 |
| Permanent set_____do____ | 5 |
| Load_____ | 52 |
| Tear resistance _____ | 30 |
| Hardness_____ | 74 |
| Resiliency_____ | 40 |

Example 4

When using 1000 parts of glycol adipic acid ester without the addition of 1.2-propylene glycol ester working with the same quantities and under the same conditions as in Example 3 the following properties are obtained:

| | |
|---|---|
| Tensile strength _____ pounds/inch$^2$ __ | 2220 |
| Elongation at break _____ per cent __ | 690 |
| Permanent set _____ do ____ | 9 |
| Load _____ | 67 |
| Tear resistance _____ | 34 |
| Hardness _____ | 64 |
| Resiliency _____ | 55 |

*Example 5*

A mixture of 175 parts of glycol adipic acid ester, OH-value 50, acid value 1, and 75 parts of 1.2-propylene-glycol adipic acid ester, OH-value 47, acid value 1, is reacted with 32.5 parts of hexamethylene-diisocyanate at 130° C. under 12 mm. pressure after evacuation. The temperature rises immediately to 130° C. After it has dropped by about 3° C. 7.5 parts of toluylene-diamine are added with stirring and the liquid melt is poured into suitable molds. After heating again for about 12 hours at 100° C., transparent, rubber elastic products are obtained having the following properties:

| | |
|---|---|
| Tensile strength _____ pounds/inch$^2$ __ | 1500 |
| Elongation at break _____ per cent __ | 728 |
| Permanent set _____ do ____ | 22 |
| Load _____ | 25 |
| Tear resistance _____ | 23 |
| Hardness _____ | 65 |
| Resiliency _____ | 51 |

*Example 6*

250 parts of glycol adipic acid ester, OH-value 52, acid value 1, are dried as indicated above and reacted with 33 parts of toluylene-diisocyanate at 130° C. After the reaction has ceased 16.3 parts of dianisidine are introduced with stirring and the liquid melt is poured out. After heating again for 6-10 hours to 100° C. the products display the following properties:

| | |
|---|---|
| Tensile strength _____ pounds/inch$^2$ __ | 1870 |
| Elongation at break _____ per cent __ | 635 |
| Permanent set _____ do ____ | 8 |
| Load _____ | 32 |
| Tear resistance _____ | 44 |
| Hardness _____ | 38 |
| Resiliency _____ | 37 |

*Example 7*

1200 parts of glycol adipic acid ester, OH-value 50, are dehydrated as indicated above and reacted with 156 parts of toluylene-diisocyanate at 130° C. The temperature rises about 12–15° C. and a hot solution of 65 parts of o-dichlorobenzidine in 130 ccs. of chlorobenzene is added. The mixture is stirred well and the contents of the vessel poured into a horizontal sheet that is heatable and coated with a thin layer of wax. A foil is obtained which at a temperature of 100° C. is removed and at the same temperature is heated again for 6–10 hours in a drying closet. It possesses the following properties:

| | |
|---|---|
| Tensile strength _____ pounds/inch$^2$ __ | 4550 |
| Elongation at break _____ per cent __ | 690 |
| Tear resistance _____ | 41 |

The chlorobenzene is used merely as a solvent for the dichlorobenzidine and may be dispensed by making the dichlorobenzidine into a paste with the same quantity of glycoladipic acid ester at 100° C.

*Example 8*

1000 parts by weight of glycol adipic acid ester dehydrated as indicated above, OH-value 50, are reacted with 160 parts of 1.5-naphthylene-diisocyanate at 130° C. with stirring. After the reaction has ceased 29.5 parts of 3-amino-phenyl-ethanol are added to the mixture. After stirring well the contents of the vessel are poured into suitable molds and heated again for 10–15 hours at 100° C. The product obtained possesses the following properties:

| | |
|---|---|
| Tensile strength _____ pounds/inch$^2$ __ | 2210 |
| Elongation at break _____ per cent __ | 650 |
| Permanent set _____ do ____ | 14 |
| Load _____ | 66 |
| Tear resistance _____ | 53 |
| Hardness _____ | 71 |
| Resiliency _____ | 32 |

On replacing the 3-amino-phenyl-ethanol by a mixture of 18 parts of o-dichlorobenzidine and 16.6 parts of quinite under the same conditions a product is obtained which possesses the following properties:

| | |
|---|---|
| Tensile strength _____ pounds/inch$^2$ __ | 1540 |
| Elongation at break _____ per cent __ | 620 |
| Permanent set _____ do ____ | 18 |
| Tear resistance _____ | 26 |
| Load _____ | 76 |
| Resiliency _____ | 47 |
| Hardness _____ | 70 |

I claim:

1. A process which comprises reacting an anhydrous, substantially linear, dicarboxylic acid-dihydric alcohol-poly condensation product having as terminal groups predominantly alcoholic hydroxyl groups with a diisocyanate in an amount of from about 20 to about 100 per cent in excess of the amount equivalent to the hydroxyl groups in said polyester, adding a bifunctional amino compound selected from the group consisting of diamines and aminoalcohols in an amount corresponding to no more than that equivalent to the free isocyanate groups in the modified polyester, said diisocyanate and said amino compound being so selected, that reaction between them in boiling methylene chloride in semimolar concentration causes no turbidity inside 25 seconds.

2. A process which comprises reacting an anhydrous, substantially linear, dicarboxylic acid-dihydric alcohol-poly condensation product having as terminal groups predominantly alcoholic hydroxyl groups with a diisocyanate in an amount of from about 20 to about 100 per cent in excess of the amount equivalent to the hydroxyl groups in said polyester, adding a bifunctional amino compound selected from the group consisting of diamines and aminoalcohols in an amount corresponding to no more than that equivalent to the free isocyanate groups in the modified polyester, said diisocyanate and said amino compound being so selected that reaction between them in boiling methylene chloride in semimolar concentration causes no turbidity inside 25 seconds and shaping the liquid reaction mixture.

3. A process which comprises reacting an anhydrous, substantially linear, diacarboxylic acid-dihydric alcohol-poly condensation product having as terminal groups predominantly alcoholic hydroxyl groups with a diisocyanate, in an amount of from about 20 to about 100 per cent in excess of the amount equivalent to the hydroxyl groups in said polyester, adding a bifunctional amino compound selected from the group consisting of the diamines and aminoalcohols in an amount corresponding to no more than that equivalent to the free isocyanate groups in the modified polyester, said diisocyanate and said amino compound being so selected that reaction between them in boiling methylene chloride in semimolar concentration causes no turbidity inside 25 seconds, casting the liquid reaction mixture into a mold and heating the cast mixture thus obtained.

4. A process which comprises reacting an anhydrous, substantially linear, dicarboxylic acid-dihydric alcohol-poly condensation product having as terminal groups predominantly alcoholic hydroxyl groups with a diisocyanate in an amount of from about 20 to about 100 per cent in excess of the amount equivalent to the hydroxyl groups in said polyester, adding a bifunctional amino compound selected from the group consisting of diamines and aminoalcohols in an amount corresponding to no more than that equivalent to the free isocyanate groups in the modified polyester, said diisocyanate and said amino compound being so selected that reaction between them in boiling methylene chloride in semimolar concentration causes no turbidity inside 25 seconds, casting the liquid reaction mixture into a mold and heating the cast mixture thus obtained to a temperature above 50 and no higher than 200° C.

5. A process which comprises reacting an anhydrous, substantially linear, dicarboxylic acid-dihydric alcohol-poly condensation product having as terminal groups predominantly alcoholic hydroxyl groups with a diisocyanate in an amount of from about 20 to about 100 per cent in excess of the amount equivalent to the hydroxyl groups in said polyester, adding a diamine in an amount corresponding to no more than that equivalent to the free isocyanate groups in the modified polyester, said diisocyanate and said amino compound being so selected that reaction between them in boiling methylene chloride in semimolar concentration causes no turbidity inside 25 seconds, casting the liquid reaction mixture into a mold and heating the cast mixture thus obtained to a temperature above 50 and not higher than 200° C.

6. A process which comprises reacting an anhydrous, substantially linear, dicarboxylic acid-dihydric alcohol-poly condensation product having as terminal groups predominantly alcoholic hydroxyl groups with an aromatic diisocyanate in an amount of from about 20 to about 100 per cent in excess of the amount equivalent to the hydroxyl groups in said polyester, adding a diamine in an amount corresponding to no more than that equivalent to the free isocyanate groups in the modified polyester, said diisocyanate and said amino compound being so selected that reaction between them in boiling methylene chloride in semimolar concentration causes no turbidity inside 25 seconds, casting the liquid reaction mixture into a mold and heating the cast mixture thus obtained to a temperature above 50 and not higher than 200° C.

7. A process which comprises reacting an anhydrous, substantially linear, dicarboxylic acid-dihydric alcohol-poly condensation product having as terminal groups predominantly alcoholic hydroxyl groups with an aromatic diisocyanate in an amount of from about 20 to about 100 per cent in excess of the amount equivalent to the hydroxyl groups in said polyester, adding an aromatic diprimary diamine in an amount corresponding to no more than that equivalent to the free isocyanate groups in the modified polyester, said diisocyanate and said amino compound being so selected that reaction between them in boiling methylene chloride in semimolar concentration causes no turbidity inside 25 seconds, casting the liquid reaction mixture into a mold and heating the cast mixture thus obtained to a temperature above 50 and not higher than 200° C.

8. A process which comprises reacting an anhydrous, substantially linear glycol-adipic-acid-polyester having substantially no free carboxyl groups and having as terminal groups predominantly alcoholic hydroxyl groups with naphthylene-diisocyanate in an amount of from about 20 to about 100 per cent in excess of the amount equivalent to the hydroxyl groups in said polyester, adding dichlorobenzidine in an amount corresponding to no more than the equivalent to the free isocyanate groups in the modified polyester, casting the liquid reaction mixture into a heated mold, causing it to solidify, and heating the molded article for a prolonged period after removal from said mold.

9. A process which comprises reacting an anhydrous, substantially linear glycol-adipic-acid-polyester having substantially no free carboxyl groups and having as terminal groups predominantly alcoholic hydroxyl groups with toluylene-diisocyanate in an amount of from about 20 to about 100 per cent in excess of the amount equivalent to the hydroxyl groups in said polyester, adding dichlorobenzidine in an amount corresponding to no more than the equivalent to the free isocyanate groups in the modified polyester, casting the liquid reaction mixture into a heated mold, causing it to solidify, and heating the molded article for a prolonged period after removal from said mold.

10. A process which comprises reacting an anhydrous, substantially linear glycol-adipic-acid-polyester having substantially no free carboxyl groups and having as terminal groups predominantly alcoholic hydroxyl groups with toluylene-diisocyanate in an amount of from about 20 to about 100 per cent in excess of the amount equivalent to the hydroxyl groups in said polyester, adding dianisidine in an amount corresponding to no more than the equivalent to the free isocyanate groups in the modified polyester, casting the liquid reaction mixture into a heated mold, causing it to solidify, and heating the molded article for a prolonged period after removal from said mold.

11. A process which comprises reacting an anhydrous polyester from a mixture of ethylene glycol, 1.2-propylene glycol and adipic acid, said polyester having as terminal groups predominantly alcoholic hydroxyl groups, with hexamethylene diisocyanate in an amount of from about 20 to about 100 per cent in excess of the amount equivalent to said hydroxyl groups, adding toluylene diamine in an amount corresponding to no more than that equivalent to the free isocyanate groups in the modified polyester, casting the liquid reaction product into a mold and heating said mould for a prolonged period.

12. An isocyanate modified polyester condensation product obtained by the process claimed in claim 1.

13. A shaped, vulcanized isocyanate modified polyester condensation product obtained by the process claimed in claim 3.

14. A shaped, vulcanized isocyanate modified polyester condensation product obtained by the process claimed in claim 7.

KARL ERWIN MÜLLER.

REFERENCES CITED

The following references are of record in the file of this patent:

UNITED STATES PATENTS

| Number | Name | Date |
|---|---|---|
| 2,284,896 | Hanford et al. | June 2, 1942 |
| 2,320,704 | Petersen et al. | June 1, 1943 |
| 2,424,885 | Buist | July 29, 1947 |